(12) United States Patent
Cheon et al.

(10) Patent No.: US 9,016,360 B2
(45) Date of Patent: Apr. 28, 2015

(54) FIXTURE STRUCTURE FOR REUSING UNDERGROUND MICRO-SEISMIC SENSOR

(71) Applicant: Korea Institute of Geoscience and Mineral Resources, Daejeon (KR)

(72) Inventors: Dae-Sung Cheon, Daejeon (KR); Eui-Sub Park, Gyeonggi-do (KR); Dae-Gee Huh, Daejeon (KR)

(73) Assignee: Korea Institute of Geoscience and Mineral Resources, Yuseong-Gu, Daejeon (KR)

( * ) Notice: Subject to any disclaimer, the term of this patent is extended or adjusted under 35 U.S.C. 154(b) by 256 days.

(21) Appl. No.: 13/661,285

(22) Filed: Oct. 26, 2012

(65) Prior Publication Data
US 2014/0008053 A1 Jan. 9, 2014

(30) Foreign Application Priority Data
Jul. 9, 2012 (KR) .......................... 10-2012-0074315

(51) Int. Cl.
*G01V 1/16* (2006.01)
*E21B 23/00* (2006.01)
*G01V 1/00* (2006.01)

(52) U.S. Cl.
CPC ................. *G01V 1/008* (2013.01); *G01V 1/166* (2013.01); *E21B 23/00* (2013.01)

(58) Field of Classification Search
CPC .......... G01V 1/166; G01V 1/168; G01V 1/52
USPC ............................................... 166/66
See application file for complete search history.

(56) References Cited

U.S. PATENT DOCUMENTS 3,859,598 A * 1/1975 McElwain et al. ............ 367/188

* cited by examiner

*Primary Examiner* — Giovanna C Wright
(74) *Attorney, Agent, or Firm* — Davis & Bujold, P.L.L.C.

(57) ABSTRACT

Disclosed herein is a fixture structure for reusing an underground micro-seismic sensor, including: a sensor body configured to be inserted in a borehole and having a sensing portion for sensing micro seismic event; a first fixture portion formed at one surface of the sensor body; a second fixture portion coupled to the first fixture portion and configured to be fixed to a grouting member injected into the borehole; and a separation unit installed between the first fixture portion and the second fixture portion and configured to separate the first fixture portion and the second fixture portion from each other by external force.

9 Claims, 6 Drawing Sheets

FIXTURE STRUCTURE FOR REUSING UNDERGROUND MICRO-SEISMIC SENSOR

CROSS REFERENCE TO RELATED APPLICATION

This application claims the benefit of Korean Patent Application No. 10-2012-74315, filed on Jul. 9, 2012, entitled "Fixture Structure for Reusing Underground Micro-seismic Sensor", which is hereby incorporated by reference in its entirety into this application.

BACKGROUND OF THE INVENTION

1. Technical Field

The present invention relates to a fixture structure configured so as to separate and reuse a micro-seismic sensor insertedly installed in a borehole.

2. Description of the Related Art

In order to effectively study and prepare for a micro-seismic tremor, it is necessary to accurately sense micro-seismic event at the time of generation of the micro-seismic event and rapidly transmit the observed micro-seismic event data to a data analyzing center.

A micro-seismic sensor is mainly configured of a micro-seismic motion sensor and a recorder, wherein the micro-seismic motion sensor is classified into a speed meter for measuring a motion speed of a ground and an accelerometer for measuring force of motion.

The speed meter is classified into a short period sensor, a long period sensor, and a broad band sensor according to a used frequency band. The short period sensor, which is a sensor designed for the purpose of observing a local micro-seismic tremor, has a flat region at a frequency of 1 Hz or more. Since the short period sensor has been designed for the purpose of a high frequency signal, it does not accurately sense a long distance micro-seismic tremor. On the other hand, the long period sensor shows a flat response in a low frequency band, such that it is appropriate for sensing a long distance seismic tremor, but has a difficulty in sensing a micro area seismic tremor generated in the vicinity. Since the broad band sensor, which uses a scheme of extending a band of a mechanical short period sensor up to a low frequency using a feedback circuit, may simultaneously record both of the micro area seismic tremor and the long distance seismic tremor, such that it may be appropriately used for studying a seismic tremor. The accelerometer, which is a sensor for sensing strong motion, provides important data in calculating an aseismic design parameter.

The micro-seismic sensor is classified into a ground surface micro-seismic sensor and an underground micro-seismic sensor according to an installation position thereof. Since the ground surface micro-seismic sensor is installed on a ground surface, it is directly affected by a surrounding environment, such that it may include a large amount of noise. On the other hand, the underground micro-seismic sensor is installed at a point at which it needs to be spatially installed even though an observation environment is not good, such that it may obtain good quality micro-seismic data. In the underground micro-seismic sensor, a scheme of first forming a borehole, temporarily fixing a micro-seismic sensor at a predetermined depth, and then permanently fixing the micro-seismic sensor by grouting is used. Therefore, once the micro-seismic sensor is installed, it may not be reused.

SUMMARY OF THE INVENTION

The present invention has been made in an effort to provide a fixture structure capable of obtaining good quality micro-seismic data and increasing utilization of a sensor by allowing a micro-seismic sensor installed under the ground to be reused.

According to an exemplary embodiment of the present invention, there is provided a fixture structure for reusing an underground micro-seismic sensor, including: a sensor body configured to be inserted in a borehole and having a sensing portion for sensing micro seismic event; a first fixture portion formed at one surface of the sensor body; a second fixture portion coupled to the first fixture portion and configured to be fixed to a grouting member injected into the borehole; and a separation unit installed between the first fixture portion and the second fixture portion and configured to separate the first fixture portion and the second fixture portion from each other by external force.

The fixture structure may further include a tube connected to the separation unit and installed to be extended toward an inlet of the borehole.

The tube may be formed in a flexible air hose shape.

The separation unit may include a shear pin installed to be sheared by fluid pressure supplied through the tube.

The fixture structure may further include a diaphragm installed around the sensor body and having an inner peripheral surface closely adhered to an outer peripheral surface of the sensor body and an outer peripheral surface closely adhered to an inner peripheral surface of the borehole.

The diaphragm may be made of a rubber material and be formed in a disk shape.

The diaphragm may have an outer diameter larger than the borehole.

The fixture structure may further include a cable connected to the sensor body so as to lift the separated sensor body and formed to transmit an electrical signal of the sensor portion.

BRIEF DESCRIPTION OF THE DRAWINGS

FIGS. 1 to 3 show a fixture structure 100 for reusing an underground micro-seismic sensor according to an exemplary embodiment of the present invention, wherein FIG. 1 is a cross-sectional view showing a shape of the fixture structure 100 installed in a borehole DW; FIG. 2 is a cross-sectional view showing a state in which fluid pressure is applied to a tube 160 in order to separate the fixture structure 100 of FIG. 1; and FIG. 3 is a cross-sectional view showing a state in which a separation unit 130 is separated by the fluid pressure.

FIGS. 4 to 6 show a fixture structure 200 for reusing an underground micro-seismic sensor according to another exemplary embodiment of the present invention, wherein FIG. 4 is a cross-sectional view showing a shape of the fixture structure 200 installed in a borehole DW; FIG. 5 is a cross-sectional view showing a state in which fluid pressure is applied to a tube 260 in order to separate the fixture structure 200 of FIG. 4; and FIG. 6 is a cross-sectional view showing a state in which a separation unit 230 is separated by the fluid pressure.

DESCRIPTION OF THE PREFERRED EMBODIMENTS

Hereinafter, a fixture structure for reusing an underground micro-seismic sensor according to the present invention will be described in detail with reference to the accompanying drawings.

Figure 1:
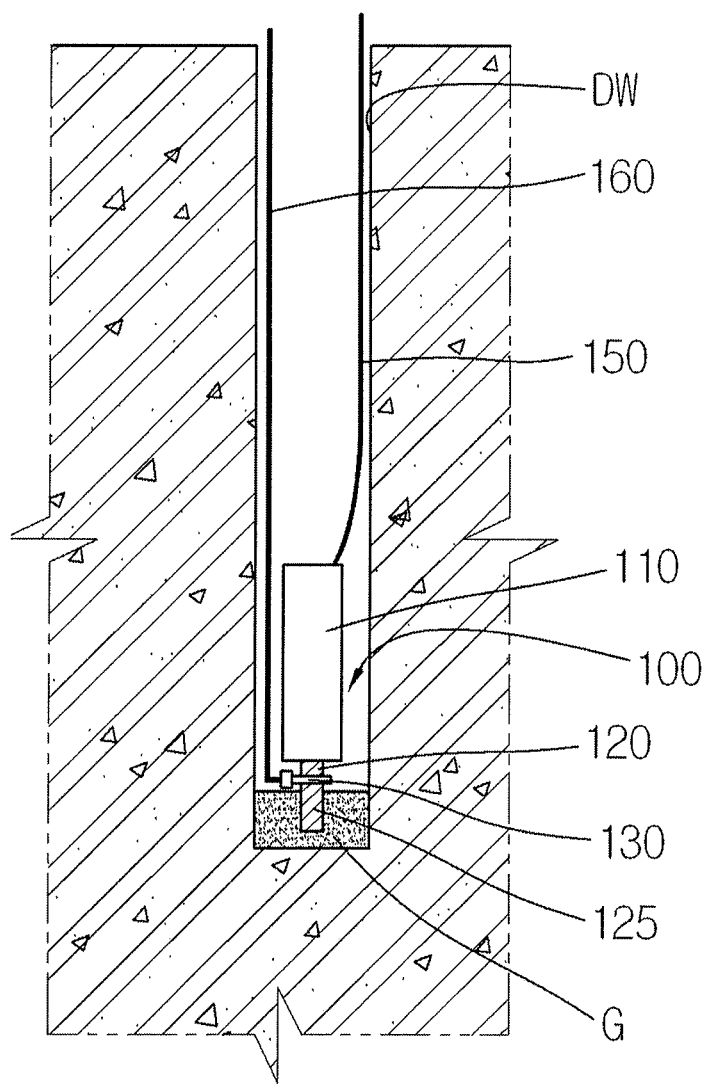
Figure 2:
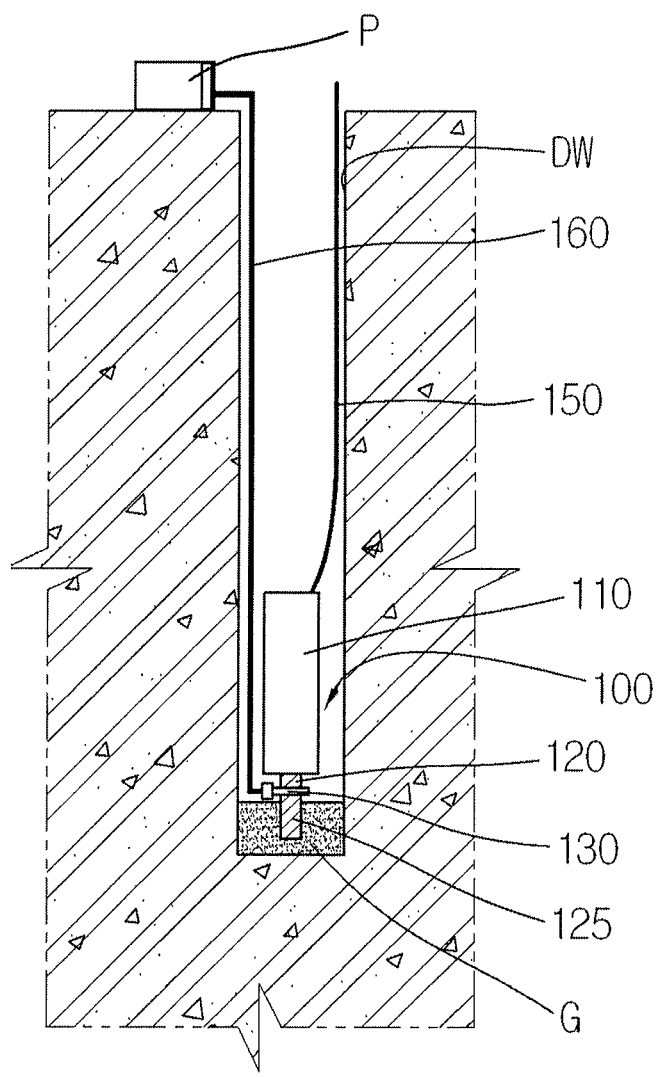
Figure 3:
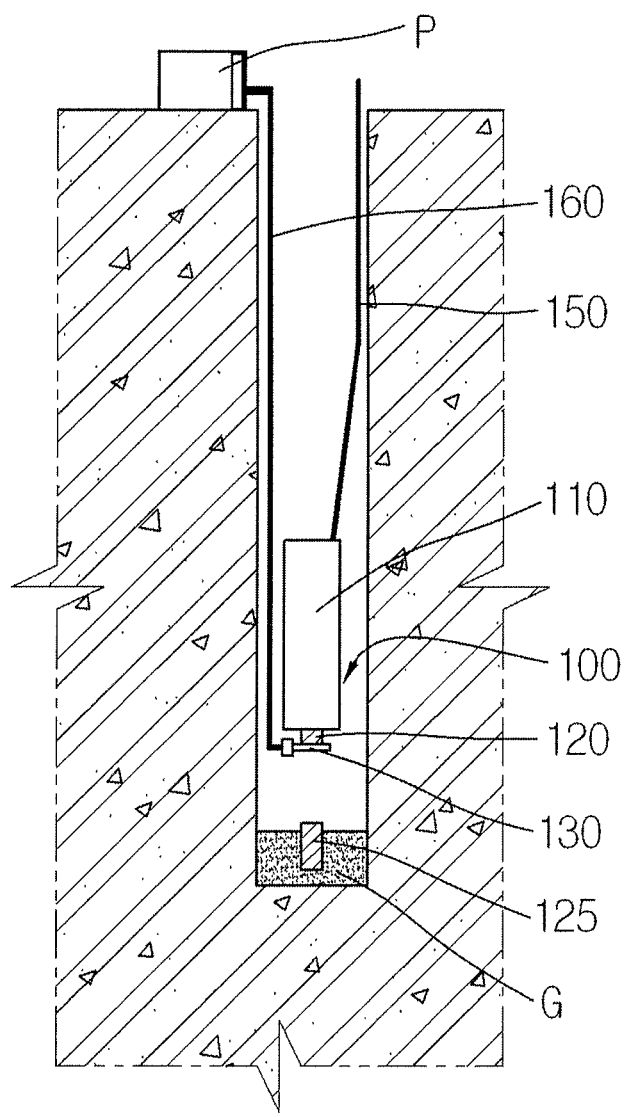

FIGS. 1 to 3 show a fixture structure 100 for reusing an underground micro-seismic sensor according to an exemplary embodiment of the present invention, wherein FIG. 1 is a cross-sectional view showing a shape of the fixture structure 100 installed in a borehole DW; FIG. 2 is a cross-sectional view showing a state in which fluid pressure is applied to a tube 160 in order to separate the fixture structure 100 of FIG. 1; and FIG. 3 is a cross-sectional view showing a state in which a separation unit 130 is separated by the fluid pressure.

As shown in FIGS. 1 to 3, the fixture structure 100 according to the present invention is installed at a lower portion of the borehole DW formed from above ground to the underground.

The fixture structure 100 shown in FIGS. 1 to 3 includes a sensor body 110 having a sensing portion, a first fixture portion 120 and a second fixture portion 125 formed at a lower portion of the sensor body 110, and a separation unit 130 installed between the first fixture portion 120 and the second fixture portion 125. A cable 150 for transmitting a signal of the sensor portion or lifting the sensor body 110 of which separation is completed is connected to one side of the sensor body 110.

One side of the separation unit 130 is installed with a tube 160 extended toward an inlet of the borehole DW. The tube 160 is connected to a pump P for providing fluid pressure, that is, air pressure, water pressure, or oil pressure from the outside. The tube 160 is configured to supply a fluid from the outside to the sensor body 110 at the time of reuse of the sensor body 110 of which use is completed, thereby separating the sensor body 110.

The separation unit 130 is formed in a shape in which it may be sheared by the fluid pressure supplied through the tube 160. As a specific example thereof, the separation unit 130 may include a shear pin that may be sheared by the fluid pressure supplied through the tube 160. As the shear pin, a well-known shear pin may be used, and a description of a detailed structure or operation thereof will be omitted.

Therefore, in the case in which the micro-seismic sensor is to be reused, when a user supplies compressed air from the outside as shown in FIGS. 2 and 3 to supply pressure equal to or larger than reference set pressure, the separation unit 130 is separated from the second fixture portion 125.

Figure 4:
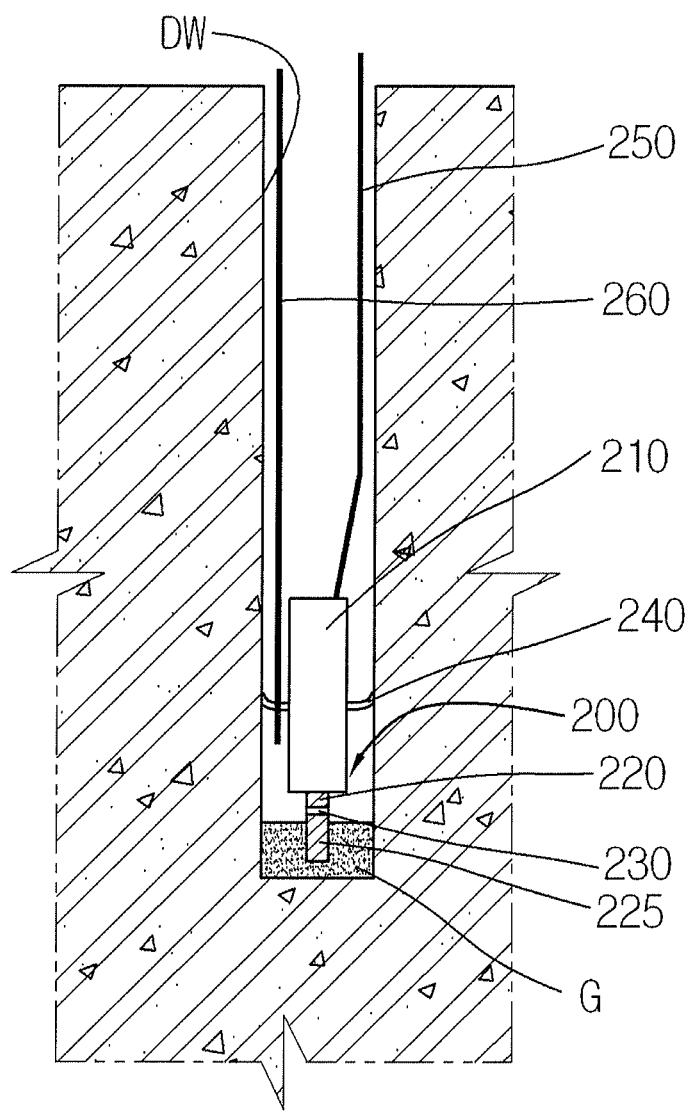
Figure 5:
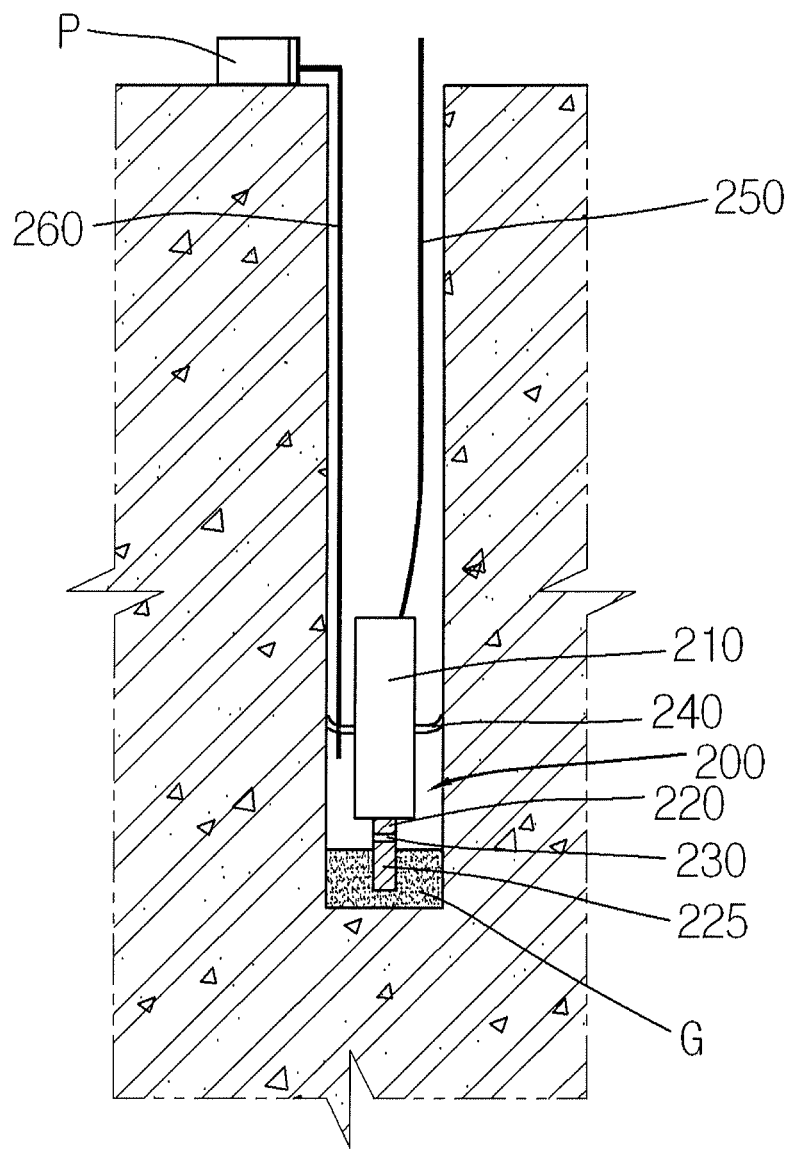
Figure 6:
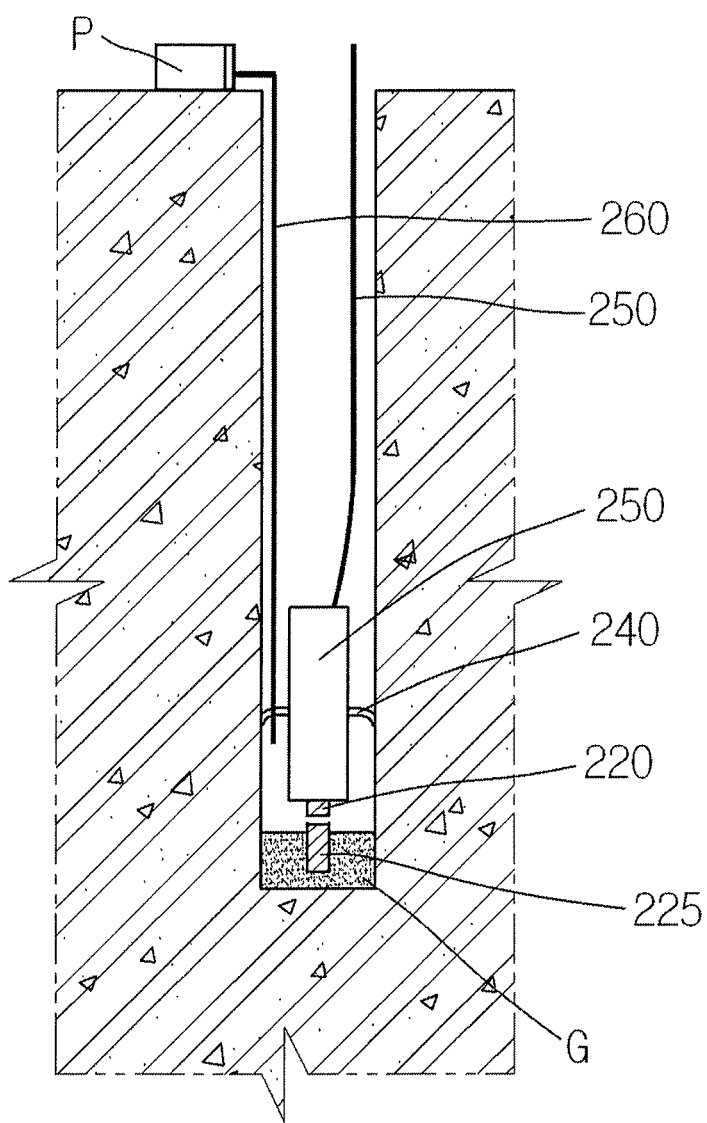

FIGS. 4 to 6 show a fixture structure 200 for reusing an underground micro-seismic sensor according to another exemplary embodiment of the present invention, wherein FIG. 4 is a cross-sectional view showing a shape of the fixture structure 200 installed in a borehole DW; FIG. 5 is a cross-sectional view showing a state in which fluid pressure is applied to a tube 260 in order to separate the fixture structure 200 of FIG. 4; and FIG. 6 is a cross-sectional view showing a state in which a separation unit 230 is separated by the fluid pressure.

As shown in FIGS. 4 to 6, the fixture structure 200 for reusing an underground micro-seismic sensor according to another exemplary embodiment of the present invention includes a sensor body 210, a first fixture portion 220 and a second fixture portion 225 formed at a lower portion of the sensor body 110, a separation unit 230 installed between the first fixture portion 220 and the second fixture portion 225, and a diaphragm 240 installed around the sensor body 210 and having an inner peripheral surface closely adhered to an outer peripheral surface of the sensor body 210 and an outer peripheral surface closely adhered to an inner peripheral surface of a borehole DW. Also in another exemplary embodiment of the present invention, the separation unit 230 may include a shear pin that may be sheared by external force.

The diaphragm 240 may have an outer diameter larger than a diameter of the borehole DW. Therefore, when the sensor body 210 mounted with the diaphragm 240 is press-fitted into the borehole DW, the diaphragm 240 is concavely deformed so that a central portion thereof is lower than an edge thereof with respect to the inner peripheral surface of the borehole SW, as shown in FIG. 4.

In this state, as shown in FIG. 5, when fluid pressure is supplied to the tube 260 through a pump P, expansive force is generated at a lower portion of the diaphragm by the fluid pressure, such that the sensor body 210 is applied with force in a direction in which it is lifted upwardly.

When fluid pressure equal to or larger than a set pressure is applied, the shear pin of the separation unit 230 is sheared, such that the first fixture portion of the sensor body 210 is separated from the second fixture portion 220. Therefore, the body 210 may be withdrawn to an outer portion of the borehole DW by lifting a cable 250.

As set forth above, the fixture structure for reusing an underground micro-seismic sensor according to the exemplary embodiment of the present invention includes the separation unit configured to separate the first fixture portion and the second fixture portion from each other by the fluid pressure supplied from the outside, thereby making it possible to easily separate the micro-seismic sensor even in a deep borehole in which it is difficult to use a tool. With the separation method of the micro-seismic sensor as described above, since the micro-seismic sensor may be reused, a cost due to additional installation of the sensor may be reduced.

The fixture structure for reusing an underground micro-seismic sensor as described above is not limited to the configurations and the methods of the above-mentioned exemplary embodiments. All or some of the above-mentioned exemplary embodiments may also be selectively combined with each other so that various modifications may be made.

What is claimed is:

1. A fixture structure for reusing an underground micro-seismic sensor, the fixture structure comprising:
   a sensor body configured to be inserted in a borehole and having a sensing portion for sensing micro seismic event;
   a first fixture portion formed at one end surface of the sensor body;
   a second fixture portion coupled to the first fixture portion and configured to be fixed to a grouting member injected into the borehole;
   a separation unit installed between the first fixture portion and the second fixture portion and configured to separate the first fixture portion from the second fixture portion by an external force; and
   a tube connected to the separation unit and installed to be extended toward an inlet of the borehole.

2. The fixture structure of claim 1, wherein the tube is flexible.

3. The fixture structure of claim 1, wherein the separation unit includes a shear pin installed to be sheared by fluid pressure supplied via the tube.

4. The fixture structure of claim 3, further comprising a cable connected to the sensor body so as to lift the separated sensor body and formed to transmit an electrical signal of the sensor portion.

5. The fixture structure of claim 1, further comprising a diaphragm installed around the sensor body and having an inner peripheral surface closely adhered to an outer peripheral surface of the sensor body and an outer peripheral surface adhered to an inner peripheral surface of the borehole.

6. The fixture structure of claim 5, wherein the diaphragm is made of a rubber material and is formed in a disk shape.

7. The fixture structure of claim 6, wherein the diaphragm has an outer diameter larger than the borehole.

8. The fixture structure of claim 1, wherein the tube, during use of the fixture structure, extends into the borehole and is coupled to the separation unit to supply the external force to the separation unit which separates the second fixture portion from the first fixture portion.

9. A fixture structure for reusing an underground microseismic sensor, the fixture structure comprising:
- a sensor body configured to be inserted in a borehole and having a sensing portion for sensing micro seismic event;
- a first fixture portion supported adjacent a first end surface of the sensor body;
- a second fixture portion coupled to the first fixture portion and configured to be fixed to a grouting member which is injected into the borehole;
- a separation unit located between the first fixture portion and the second fixture portion and configured, upon application of an external force, to facilitate separating the first fixture portion from the second fixture portion; and
- a supply tube extending into the borehole, during use of the fixture structure, and being coupled to the separation unit to supply the external force to the separation unit which separates the second fixture portion from the first fixture portion.

* * * * *